United States Patent
Matsushima et al.

(10) Patent No.: US 11,618,703 B2
(45) Date of Patent: Apr. 4, 2023

(54) CRUDE OIL SLUDGE TREATMENT AGENT, CRUDE OIL SLUDGE TREATMENT METHOD AND CRUDE OIL SLUDGE TREATMENT AGENT KIT

(71) Applicant: Japan Ecosystem Co., Ltd., Aichi-ken (JP)

(72) Inventors: Minoru Matsushima, Ichinomiya (JP); Takehito Sugiura, Ichinomiya (JP); Michiyo Sugiura, Ichinomiya (JP)

(73) Assignee: Japan Ecosystem Co., Ltd., Aichi-ken (JP)

( * ) Notice: Subject to any disclaimer, the term of this patent is extended or adjusted under 35 U.S.C. 154(b) by 0 days.

(21) Appl. No.: 17/837,844

(22) Filed: Jun. 10, 2022

(65) Prior Publication Data
US 2022/0402796 A1 Dec. 22, 2022

(30) Foreign Application Priority Data
Jun. 14, 2021 (JP) .............................. JP2021-098533

(51) Int. Cl.
*C02F 11/00* (2006.01)
*C02F 103/36* (2006.01)
(52) U.S. Cl.
CPC ........ *C02F 11/00* (2013.01); *C02F 2103/365* (2013.01); *C02F 2305/00* (2013.01)
(58) Field of Classification Search
None
See application file for complete search history.

(56) References Cited

U.S. PATENT DOCUMENTS

2009/0152208 A1* 6/2009 Agrawal ................... C02F 1/20
210/758
2009/0289016 A1  11/2009 Hayashi et al.
(Continued)

FOREIGN PATENT DOCUMENTS

CN   108706843 A   10/2018
CN   110054319 A   7/2019
(Continued)

OTHER PUBLICATIONS

Chen et al. Synergistic effect of surfactant and alkali on the treatment of oil sludge. Journal of Petroleum Science and Engineering, 2019; 183:106420, 8 pages.
(Continued)

*Primary Examiner* — Richard C Gurtowski
(74) *Attorney, Agent, or Firm* — Wolf, Greenfield & Sacks, P.C.

(57) ABSTRACT

The crude oil sludge treatment agent is mixed with crude oil sludge and water and used for treatment of the crude oil sludge under alkali conditions. The crude oil sludge treatment agent contains green rust. The crude oil sludge treatment agent may further contain either or both a metal and a metal ferrite. The metal and the metal of the metal ferrite are one or more selected from the group consisting of aluminum, yttrium, zinc, copper, tin, chromium and silicon. The crude oil sludge treatment agent may also contain one or more selected from the group consisting of aluminum ferrite, yttrium ferrite and zinc ferrite. The crude oil sludge treatment method includes a mixing step in which crude oil sludge, water and green rust are mixed under alkali conditions.

6 Claims, 1 Drawing Sheet

(56) References Cited

U.S. PATENT DOCUMENTS

| | | | |
|---|---|---|---|
| 2012/0228229 A1 | 9/2012 | Douglas | |
| 2013/0256590 A1* | 10/2013 | Baseeth | B09C 1/002 |
| | | | 252/176 |
| 2014/0014590 A1* | 1/2014 | Dalbo | C02F 1/52 |
| | | | 210/714 |
| 2014/0182737 A1* | 7/2014 | Jones | G01N 22/00 |
| | | | 138/177 |
| 2021/0317024 A1 | 10/2021 | Sugiura et al. | |

FOREIGN PATENT DOCUMENTS

| | | |
|---|---|---|
| CN | 110078184 A | 8/2019 |
| JP | H-08170085 A | 7/1996 |
| JP | H-09201574 A | 8/1997 |
| JP | 2013-184983 A | 9/2013 |
| JP | 2018-134597 A | 8/2018 |
| JP | 2019-099423 A | 6/2019 |
| JP | 2019-217474 A | 12/2019 |
| WO | WO 2020-095999 A1 | 2/2021 |

OTHER PUBLICATIONS

Hibino. Environmentally friendly applications of hydrotalcite-like compounds. Journal of the Clay Science Society of Japan, 2003; 42(3): 139-43.

Zhang et. al. Highly efficient treatment of oily wastewater using magnetic carbon nanotubes/layered double hydroxides composites. Colloids and Surfaces A. 2020; 586:124187. 12 pages.

Extended European Search Report dated Oct. 28, 2022, in connection with European Application No. 22178321.0.

* cited by examiner

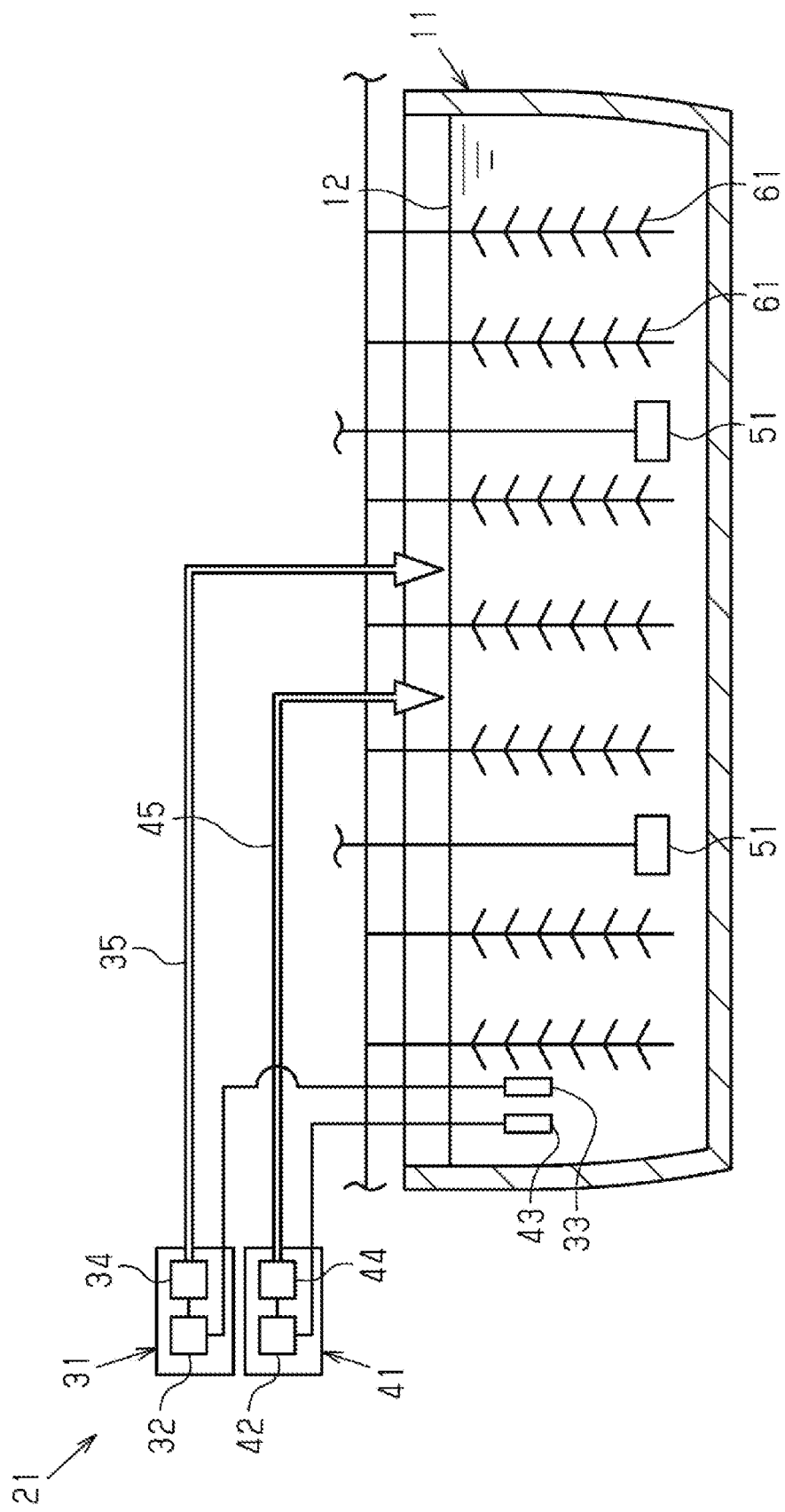

CRUDE OIL SLUDGE TREATMENT AGENT, CRUDE OIL SLUDGE TREATMENT METHOD AND CRUDE OIL SLUDGE TREATMENT AGENT KIT

CROSS REFERENCE TO RELATED APPLICATION

This Application is based upon and claims the benefit of priority from Japanese Patent Application No. 2021-098533, filed on Jun. 14, 2021. The entire contents of which are incorporated herein by reference in its entirety.

BACKGROUND

1. Field

The following description relates to a crude oil sludge treatment agent, a crude oil sludge treatment method and a crude oil sludge treatment agent kit.

2. Description of Related Art

Tanks that store crude oil accumulate sedimentation known as crude oil sludge. Crude oil sludge is composed of hydrocarbon substances such as waxes or asphaltene, with water such as seawater, microorganic decomposition products, sand and rust, etc. It is necessary to periodically remove such crude oil sludge. Japanese Laid-Open Patent Publication Nos. H08-170085 and H09-201574, for example, disclose crude oil sludge treatment agents containing surfactants.

On the other hand, green rust is known as a component for water treatment agents used to treat aqueous solutions containing heavy metal, etc., as disclosed in Japanese Laid-Open Patent Publication No. 2019-099423 and International Publication No. WO 2020/095999. Methods are also known that employ basalt fibers to adsorb microorganisms in sludge treatment methods, as disclosed in Japanese Laid-Open Patent Publication No. 2018-134597.

SUMMARY

It is an objective of the present disclosure to provide a crude oil sludge treatment agent that is able to decompose crude oil sludge described above.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a crude oil sludge treatment agent is configured to be mixed with crude oil sludge and water for treatment of the crude oil sludge under alkali conditions. The crude oil sludge treatment agent contains green rust.

The crude oil sludge treatment agent may further contain either or both a metal and a metal ferrite, the metal and the metal of the metal ferrite being one or more selected from the group consisting of aluminum, yttrium, zinc, copper, tin, chromium and silicon.

The crude oil sludge treatment agent may further contain one or more selected from the group consisting of aluminum ferrite, yttrium ferrite and zinc ferrite.

In another general aspect, a crude oil sludge treatment method includes a mixing step in which crude oil sludge, water and green rust are mixed under alkali conditions.

In the crude oil sludge treatment method, the mixing step may be carried out in a container housing basalt fibers.

In another general aspect, a crude oil sludge treatment agent kit is provided with a first agent containing green rust and a second agent containing either or both a metal and a metal ferrite, wherein the metal and the metal of the metal ferrite are one or more selected from the group consisting of aluminum, yttrium, zinc, copper, tin, chromium and silicon.

Other features and aspects will be apparent from the following detailed description, the drawings, and the claims.

BRIEF DESCRIPTION OF THE DRAWINGS

FIG. 1 is a schematic diagram of a processing apparatus for crude oil sludge according to an embodiment of the present invention.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Embodiments of a crude oil sludge treatment agent, crude oil sludge treatment method and crude oil sludge treatment agent kit will now be described.

<Crude Oil Sludge Treatment Agent>

Crude oil sludge is sediment in crude oil storage vessels such as crude oil tanks. Crude oil sludge is composed of hydrocarbon substances such as waxes or asphaltene, with water such as seawater, microorganic decomposition products, sand and rust, etc.

The crude oil sludge treatment agent is mixed with crude oil sludge and water and used for treatment of the crude oil sludge under alkali conditions. The crude oil sludge treatment agent contains green rust.

Green rust is a light blue transparent or light green transparent substance formed of ferrous hydroxide and ferric hydroxide layers. Examples of types of green rust include those described in Japanese Laid-Open Patent Publication No. 2019-099423 and International Publication No. WO 2020/095999.

The crude oil sludge treatment agent may further contain either or both a metal and a metal ferrite. The metal and the metal of the metal ferrite are one or more selected from the group consisting of aluminum, yttrium, zinc, copper, tin, chromium and silicon.

The crude oil sludge treatment agent may contain, among metal ferrites, one or more selected from the group consisting of aluminum ferrite, yttrium ferrite and zinc ferrite.

<Method for Producing Crude Oil Sludge Treatment Agent>

The method for producing the crude oil sludge treatment agent includes a green rust generating step. In the green rust generating step of this embodiment, water is first prepared containing a reduction catalyst.

The reduction catalyst contains graphite and either or both iron and ferritic iron. Examples of graphite include natural graphite and artificial graphite. The reduction catalyst may contain graphite in the range of 40 parts by mass or greater and 70 parts by mass or lower, and either or both iron and ferritic iron in the range of 20 parts by mass or greater and 50 parts by mass or lower.

The form of the reduction catalyst may be powdered or as masses, etc. The form of the reduction catalyst may be powdered from the viewpoint of higher reactivity by way of increased surface area.

In the green rust generating step, an oxidation-reduction reaction is conducted by adjusting the pH of the water containing the reduction catalyst to the range of 2 or greater and 5 or lower with stirring. The pH during the oxidation-reduction reaction may be in the range of 3.5 or greater and 4.5 or lower.

After the oxidation-reduction reaction in the reduction catalyst-containing water described above, in the green rust generating step, either or both a ferrous ion and a ferrous compound are added to generate green rust in the water. The green rust may be generated while stirring the water. The green rust is obtained in the form of a suspension.

The blended amounts of either or both the ferrous ion and the ferrous compound may be in the range of 15 parts by mass or greater and 300 parts by mass or lower. The green rust generation may be completed upon confirming an oxidation-reduction potential in the range of −950 mV or greater and −400 mV or lower with the pH adjusted to the range of 10.5±0.5. In some embodiments, the oxidation-reduction potential may be in the range of −950 mV or greater and −600 mV or lower.

When either or both a metal and a metal ferrite described above are to be contained to the crude oil sludge treatment agent, the method for producing the crude oil sludge treatment agent includes a blending step in which either or both the metal and the metal ferrite are blended. The metal and the metal of the metal ferrite are one or more selected from the group consisting of aluminum, yttrium, zinc, copper, tin, chromium and silicon, as described above. The blending step may be a step in which either or both the metal and the metal ferrite are blended to the green rust, or a step in which either or both the metal and the metal ferrite are blended to the water before generation of green rust. The blended amounts of either or both the metal and the metal ferrite may be in the range of 2 parts by mass or greater and 10 parts by mass or lower.

A metal ferrite can be obtained by an ambient temperature ferrite process, for example. Ambient temperature ferrite processes include processes using chemical treatment agents, as disclosed in Japanese Laid-Open Patent Publication No. 2013-184983 (Japanese Patent No. 5194223), for example.

<Crude Oil Sludge Treatment Method>

The crude oil sludge treatment method includes a mixing step in which crude oil sludge, water and green rust are mixed under alkali conditions. In the mixing step of this embodiment, crude oil sludge, water and the crude oil sludge treatment agent are mixed together under alkali conditions. The amount of water blended to the crude oil sludge is in a range of, for example, 2-fold or greater and 500-fold or less of the mass of the crude oil sludge.

An example of a crude oil sludge treatment apparatus for the crude oil sludge treatment method will now be described.

As shown in FIG. 1, a crude oil storage vessel 11 stores a liquid to be treated 12 containing crude oil sludge and water. The liquid to be treated 12 is obtained by discharging crude oil in the crude oil storage vessel 11 and then supplying water into the crude oil storage vessel 11 in which crude oil sludge has remained.

The crude oil sludge treatment apparatus 21 includes an alkali supply unit 31 that supplies an alkali to the liquid to be treated 12 to adjust the liquid to be treated 12 to alkali conditions, and a crude oil sludge treatment agent supply unit 41 that supplies a crude oil sludge treatment agent to the liquid to be treated 12. The crude oil sludge treatment apparatus 21 also includes a stirrer 51 that stirs the liquid to be treated 12. The treatment apparatus of this embodiment further includes basalt fibers 61 immersed in the liquid to be treated 12.

The alkali supply unit 31 includes a controller 32, a pH sensor 33 that measures the pH of the liquid to be treated 12, a liquid feed pump 34 that feeds an alkali, and an alkali supply channel 35 that supplies the alkali to the liquid to be treated 12. The controller 32 controls supply of the alkali using the liquid feed pump 34 and alkali supply channel 35, based on the pH of the liquid to be treated 12 that is measured with the pH sensor 33. The pH of the liquid to be treated 12 falls as treatment of the liquid to be treated 12 proceeds in the mixing step. Therefore, the alkali supply unit 31 may be used to control the pH in the mixing step so that the pH of the liquid to be treated 12 is at a predetermined pH value or greater.

The pH of the liquid to be treated 12 in the mixing step may be in the range of higher than 7.0 and 12.0 or lower. In some embodiments, the pH of the liquid to be treated 12 in the mixing step may be in the range of higher than 7.0 and 11.5 or lower. Examples of alkalis to be used for pH adjustment include sodium hydroxide and potassium hydroxide. An aqueous alkali solution may be used for pH adjustment.

The crude oil sludge treatment agent supply unit 41 includes a controller 42 and an oxidation-reduction potential sensor 43 that measures the oxidation-reduction potential of the liquid to be treated 12. The crude oil sludge treatment agent supply unit 41 includes a liquid feed pump 44 that feeds the crude oil sludge treatment agent, and a crude oil sludge treatment agent supply channel 45 that supplies the crude oil sludge treatment agent to the liquid to be treated 12. The controller 42 controls supply of the crude oil sludge treatment agent using the liquid feed pump 44 and crude oil sludge treatment agent supply channel 45, based on the oxidation-reduction potential of the liquid to be treated 12 measured by the oxidation-reduction potential sensor 43. The oxidation-reduction potential of the liquid to be treated 12 increases as treatment of the liquid to be treated 12 proceeds during the mixing step. Therefore, the crude oil sludge treatment agent supply unit 41 may be used during the mixing step to control the oxidation-reduction potential so that the oxidation-reduction potential of the liquid to be treated 12 does not exceed the predetermined oxidation-reduction potential value.

The oxidation-reduction potential of the liquid to be treated 12 during the mixing step may be in the range of −950 mV or greater and −500 mV or lower. In some embodiments, the oxidation-reduction potential of the liquid to be treated 12 during the mixing step may be in the range of −650 mV or greater and −550 mV or lower. In order to control the oxidation-reduction potential during the mixing step, the crude oil sludge treatment agent may also be used in combination with a reducing agent to promote a reduction reaction. Calcium hydroxide is an example of such a reducing agent.

The mixing step in the crude oil sludge treatment method may be carried out for 4 days or longer, for example. The mixing step may be carried out in a crude oil storage vessel 11 housing basalt fibers 61. The starting material for the basalt fibers 61 is natural basalt. Basalt contains silicon dioxide ($SiO_2$) at about 50 mass %. Basalt also contains hematite and iron oxide ($Fe_2O_3$, $Fe_2O$) at about 15%. The basalt fibers 61 adsorb green rust that is present in the liquid to be treated 12. It is conjectured that, when the basalt fibers 61 are oscillated in the liquid to be treated 12 to which the green rust has been added, it results in electron transfer between the basalt fibers 61 and green rust, causing adsorption of the green rust. When the green rust is adsorbed onto the basalt fibers 61, precipitation of the green rust in the form of masses is inhibited. This can increase the contact area between the green rust and crude oil sludge, allowing decomposition reaction of the crude oil sludge to proceed.

The fiber diameters of the basalt fibers 61 are in the range of 10 μm or greater and 30 μm or lower, or in the range of 10 μm or greater and 15 μm or lower, for example. The basalt fibers 61 may be long basalt filaments from the viewpoint of easier handling. The fiber lengths of the basalt fibers may be in the range of 100 mm or greater and 220 mm or lower, for example. The basalt fibers 61 may be basalt carriers. Basalt carriers aggregate the basalt fibers 61 to facilitate housing of the basalt fibers 61 within the crude oil storage vessel 11. Examples of basalt carriers include basalt fibers 61 aggregated into the form of ropes, tufts, cloths or nets. Basalt carriers may be hung in a suspended manner and housed within the crude oil storage vessel 11.

In some embodiments, the basalt fibers 61 may be modified basalt fibers. Examples of modified basalt fibers include ferritic iron-modified basalt fibers containing ferritic iron, and resin-modified basalt fibers containing a resin. Examples of resin-modified basalt fibers include resin-modified basalt fibers composed of twisted threads of basalt fibers and resin fibers, resin-modified basalt fibers with a resin bonding together some of the basalt fibers, and resin-modified basalt fibers with a resin coating some of the basalt fibers.

The basalt fibers 61 may be used in an amount of 1 g or greater and 1000 g or lower per 1 L of water, for example.

The functions and effects of the present embodiment will now be described.

(1) The crude oil sludge treatment agent is mixed with crude oil sludge and water and used for treatment of the crude oil sludge under alkali conditions. The crude oil sludge treatment agent contains green rust. With this composition, it is possible to decompose crude oil sludge. Specifically, the oil components in the crude oil sludge can be decomposed and solubilized in water. This will allow the crude oil sludge to be easily discharged from the crude oil storage vessel 11.

(2) The crude oil sludge treatment agent may further contain either or both a metal and a metal ferrite. The metal and the metal of the metal ferrite are one or more selected from the group consisting of aluminum, yttrium, zinc, copper, tin, chromium and silicon. In some embodiments, the crude oil sludge treatment agent may contain, among metal ferrites, one or more selected from the group consisting of aluminum ferrite, yttrium ferrite and zinc ferrite.

This can promote decomposition of the oil components in the crude oil sludge and their solubilization in water. It is thus possible to treat crude oil sludge in a shorter period of time.

(3) The crude oil sludge treatment method includes a mixing step in which crude oil sludge, water and green rust are mixed under alkali conditions. This method allows crude oil sludge to be easily discharged from the crude oil storage vessel 11, as described in (1) above.

Crude oil sludge often contains hydrogen sulfide and thiols. This can make treatment of crude oil sludge cumbersome due to the measures that are necessary against odors caused by hydrogen sulfide and thiols. By using the crude oil sludge treatment method of this embodiment, however, it is possible to rapidly reduce the concentration of hydrogen sulfide and thiols that cause such odors. Treatment of crude oil sludge can thus be carried out with simpler measures against odors.

The mixing step may be carried out within a vessel housing basalt fibers 61. This can promote decomposition of the oil components in the crude oil sludge and their solubilization in water. It is thus possible to treat crude oil sludge in a shorter period of time.

Modified Embodiment

The embodiment described above may be modified in the following manner. The embodiment and its modification may be carried out in combination within ranges that are technically consistent.

The crude oil sludge treatment method may be carried out without using basalt fibers 61.

The crude oil sludge treatment agent may be a crude oil sludge treatment agent kit including a first agent and a second agent. The first agent of the crude oil sludge treatment agent kit contains green rust. The second agent of the crude oil sludge treatment agent kit contains either or both the metal and the metal ferrite described above. The crude oil sludge treatment agent kit may be used by a method of mixing the crude oil sludge and water after the first agent and second agent have been mixed in advance, or by a method of mixing the first agent and second agent separately with the crude oil sludge and the water.

The crude oil sludge treatment method is not limited to the method using the crude oil sludge treatment apparatus 21 described above. The alkali and crude oil sludge treatment agent may be manually added in the crude oil sludge treatment method, based on the pH and oxidation-reduction potential of the liquid to be treated 12, for example. The crude oil sludge treatment method may include stirring for several days after addition of an excess of the alkali and an excess of the crude oil sludge treatment agent at the start of treatment.

The crude oil storage vessel 11 in which the crude oil sludge is to be treated is not limited to a land-based tank and it may be a tank on an offshore tanker.

TEST EXAMPLES

Test examples will now be described.

Test Example 1

1. Preparation of Green Rust

Green rust for Test Example 1 was prepared in the following manner. The green rust was prepared by first mixing 600 g of graphite and 400 g of ferritic iron ($Fe_3O_4$)

to prepare a reduction catalyst. A reduction catalyst adsorbed in a filtration cloth was housed in a tubular vessel made of punched stainless steel and anchored in a water tank containing 10 L of water. The following procedure was carried out with the reduction catalyst immersed in water as the reaction solution.

The pH of the reaction solution was adjusted to the range of 3.5 or greater and 4.5 or lower by addition of dilute sulfuric acid while stirring, after which stirring of the reaction solution was continued for 40 hours. Next, 1200 g of ferrous sulfate ($FeSO_4 \cdot 7H_2O$) was added while stirring the reaction solution. The oxidation-reduction potential (ORP) of the reaction solution was ≤400 mV after addition of ferrous sulfate. The reaction solution was further stirred for 40 hours to obtain a green rust suspension.

An aqueous sodium hydroxide solution (48% (w/v)) was then added to adjust the pH to 10.5. Stirring and pH adjustment were stopped upon confirming that the oxidation-reduction potential was in the range of −800 mV or greater and −700 mV or lower. Confirmation was based on whether or not the resulting suspension color was light blue transparent or light green transparent. The total iron content of the resulting green rust suspension was 33,000 mg/L.

2. Crude Oil Sludge Treatment Test

The green rust suspension obtained in Test Example 1 was used as a crude oil sludge treatment agent. In the crude oil sludge treatment test, 40 g of crude oil sludge was first placed in a 1000 mL beaker and 1000 mL of purified water was added to prepare a liquid to be treated containing crude oil sludge and water. Table 1 shows the analysis results for the crude oil sludge components.

TABLE 1

| Property | Unit | Value |
| --- | --- | --- |
| Appearance | — | Brown |
| Sulfur | wt % | 0.75 |
| Sediment | wt % | 6.0 |
| Oil | wt % | 69 |
| Water | vol % | 25 |
| Fe (Iron) | % | 36 |
| Cr (Chromium) | % | 0.1 |
| Cu (Copper) | mg/L | 466 |
| Mn (Manganese) | % | 0.5 |

The pH of the liquid to be treated was then adjusted to 11.0. The pH adjustment was carried out by adding an aqueous sodium hydroxide solution (25% (w/v)) to the liquid to be treated while stirring the liquid to be treated with a stirrer.

The pH of the liquid to be treated falls as treatment of the crude oil sludge proceeds. When the pH of the liquid to be treated fell below 10.5, therefore, aqueous sodium hydroxide solution was again added until the pH value reached 11.0. The pH can be controlled in this manner using the alkali supply unit described above.

The crude oil sludge treatment agent was then added to the pH-adjusted liquid to be treated. The crude oil sludge treatment agent was added until the oxidation-reduction potential of the liquid to be treated reached −600 mV. The oxidation-reduction potential of the liquid to be treated increases as treatment of the crude oil sludge proceeds. When the oxidation-reduction potential exceeded −600 mV, therefore, crude oil sludge treatment agent was again added until it reached −630 mV. The oxidation-reduction potential can be controlled in this manner using the crude oil sludge treatment agent supply unit described above.

3. Analyzed Properties

After 5 days of crude oil sludge treatment testing, a sample of the liquid to be treated was analyzed for the following Properties 1 to 10. The results of property analysis are shown in Table 2.

Property 1. TOC

TOC represents the total organic carbon (unit: mg/L). The organic material in the sample is oxidized to carbon dioxide and the amount of carbon dioxide is measured to determine the TOC. TOC can be measured based on combustion oxidation, for example.

Property 2. COD

COD represents the chemical oxygen demand (unit: mg/L). The COD was determined by oxidation of the oxidizable substances in the sample with an oxidizing agent under constant conditions, calculating the amount of oxygen necessary for oxidation based on the amount of oxidizing agent consumed. The substances to be oxidized include various organic materials and inorganic materials such as nitrites and sulfides, but are mainly organic materials. It can be measured by the acidic high temperature permanganic acid method.

Property 3. n-Hex

N-Hex represents the normal-hexane extract content (unit: mg/L). N-Hex is the content of non-volatile substances among the components in a sample, extracted using normal-hexane as the solvent.

Property 4. SS

SS represents suspended solids (unit: mg/L). SS is a general term for insoluble substances with particle sizes of ≤2 mm suspended in a sample.

Property 5. T-N

T-N represents the total nitrogen (unit: mg/L). T-N is the total amount of nitrogen compound contained in a sample.

Property 6. T-P

T-P represents the total phosphorus (unit: mg/L). T-P is the total amount of phosphorus compounds contained in a sample.

Property 7. Fe

Fe (unit: mg/L) is the total amount of Fe contained in a sample.

Property 8. Mn

Mn (unit: mg/L) is the total amount of Mn contained in a sample.

Property 9. Cu

Cu (unit: mg/L) is the total amount of Cu contained in a sample.

Property 10. Cr

Cr (unit: mg/L) is the total amount of Cr contained in a sample.

Test Example 2

For Test Example 2, a crude oil sludge treatment agent was prepared by mixing 95 parts by mass of green rust suspension and 5 parts by mass of silicon ferrite, as shown in Table 2. The crude oil sludge treatment solution was used for a crude oil sludge treatment test in the same manner as Test Example 1. Table 2 shows the results of measuring the properties of a sample of the liquid to be treated after 5 days of crude oil sludge treatment testing.

Test Example 3

For Test Example 3, a crude oil sludge treatment agent was prepared by mixing 95 parts by mass of green rust suspension and 5 parts by mass of yttrium ferrite, as shown in Table 2. The crude oil sludge treatment solution was used for a crude oil sludge treatment test in the same manner as Test Example 1. Table 2 shows the results of measuring the properties of a sample of the liquid to be treated after 4 days of crude oil sludge treatment testing.

Test Example 4

For Test Example 4, a crude oil sludge treatment agent was prepared by mixing 95 parts by mass of green rust suspension and 5 parts by mass of aluminum ferrite, as shown in Table 2. The crude oil sludge treatment solution was used for a crude oil sludge treatment test in the same manner as Test Example 1. Table 2 shows the results of measuring the properties of a sample of the liquid to be treated after 4 days of crude oil sludge treatment testing.

Test Example 5

For Test Example 5, a crude oil sludge treatment agent was prepared by mixing 95 parts by mass of green rust suspension and 5 parts by mass of zinc ferrite, as shown in Table 2. The crude oil sludge treatment solution was used for a crude oil sludge treatment test in the same manner as Test Example 1. Table 2 shows the results of measuring the properties of a sample of the liquid to be treated after 4 days of crude oil sludge treatment testing.

Test Examples 6 to 8

For Test Examples 6 to 8, a crude oil sludge treatment agent was prepared by mixing a green rust suspension, yttrium ferrite and aluminum ferrite, as shown in Table 3. The crude oil sludge treatment solution was used for a crude oil sludge treatment test in the same manner as Test Example 1. Table 3 shows the results of measuring the properties of a sample of the liquid to be treated after 4 days of crude oil sludge treatment testing.

Test Example 9

1. Preparation of Aluminum Ferrite Dispersion

For Test Example 9, an aluminum ferrite dispersion prepared by an ambient temperature ferrite process was used. For preparation of the aluminum ferrite dispersion, first, a mixture of 314 g of ferrous sulfate ($Fe_2SO_4 \cdot 7H_2O$) with 1552 g of water was added to a 2000 mL vessel and stirred. An equivalent or greater amount of an alkali (48% aqueous sodium hydroxide solution) was then added, and aluminum was further added while stirring to prepare a raw material solution. The obtained raw material solution was stirred for at least 2 hours and an oxidation-reduction reaction was conducted with addition of 0.2 mL of the chemical treatment agent disclosed in Japanese Laid-Open Patent Publication No. 2013-184983 (Japanese Patent No. 5194223). At this time, the oxidation-reduction potential of the reaction mixture was measured to confirm transition of the oxidation-reduction potential to the negative, i.e., at the reduction end. An aluminum ferrite dispersion was obtained by the oxidation-reduction reaction.

2. Preparation of Crude Oil Sludge Treatment Agent

A reduction catalyst was prepared by mixing 20 g of graphite and 80 g of ferritic iron ($Fe_3O_4$). A reduction catalyst adsorbed in a filtration cloth was housed in a tubular vessel made of punched stainless steel and anchored in a water tank containing 13,420 L of water. The following procedure was carried out with the reduction catalyst immersed in water as the reaction solution.

The pH of the reaction solution was adjusted to the range of 3.5 or greater and 4.5 or lower by addition of dilute sulfuric acid while stirring, after which stirring of the reaction solution was continued for 40 hours. Next, 2700 g of ferrous sulfate ($FeSO_4 \cdot 7H_2O$) and 2000 g of the aluminum ferrite dispersion were added to the reaction solution while stirring. The oxidation-reduction potential (ORP) was ≤400 mV. The reaction solution was further stirred for 40 hours to obtain a green rust suspension.

An aqueous sodium hydroxide solution (48% (w/v)) was then added to adjust the pH to 10.5. Stirring and pH adjustment were stopped upon confirming that the oxidation-reduction potential was in the range of −800 mV or greater and −700 mV or lower. Confirmation was based on whether or not the resulting suspension color was light blue transparent or light green transparent. The total iron content of the resulting green rust suspension was 33,000 mg/L.

3. Crude Oil Sludge Treatment Test and Analysis

A crude oil sludge treatment solution obtained as described above was used for a crude oil sludge treatment test in the same manner as Test Example 1. Table 3 shows the results of measuring the properties of a sample of the liquid to be treated after 4 days of crude oil sludge treatment testing.

Test Example 10

For Test Example 10, a crude oil sludge treatment test was carried out in the same manner as Test Example 9 except for using basalt fibers. Specifically, after preparing a liquid to be treated containing crude oil sludge and water for the crude oil sludge treatment test, the following procedure was carried out with a basalt carrier in the form of a tuft of 10 g of basalt fibers with the fiber diameter of 13 μm, hanging suspended and immersed in the liquid to be treated.

Table 3 shows the results of measuring the properties of a sample of the liquid to be treated after 4 days of crude oil sludge treatment testing.

TABLE 2

|  | Test Example 1 | Test Example 2 | Test Example 3 | Test Example 4 | Test Example 5 |
| --- | --- | --- | --- | --- | --- |
| Green rust suspension [pts by wt.] | 100 | 95 | 95 | 95 | 95 |
| Silicon ferrite [pts by wt.] | 0 | 5 | 0 | 0 | 0 |
| Yttrium ferrite [pts by wt.] | 0 | 0 | 5 | 0 | 0 |
| Aluminum ferrite [pts by wt.] | 0 | 0 | 0 | 5 | 0 |
| Zinc ferrite [pts by wt.] | 0 | 0 | 0 | 0 | 5 |
| Basalt fibers | Without | Without | Without | Without | Without |
| Days [day] | 5 | 5 | 4 | 4 | 4 |
| TOC [mg/L] | 263 | 234 | 184 | 107 | 89 |
| COD [mg/L] | 210 | 190 | 160 | 80 | 76 |
| n-Hex [mg/L] | 38 | 20 | 4.2 | 2.6 | 3.1 |

TABLE 2-continued

|  | Test Example 1 | Test Example 2 | Test Example 3 | Test Example 4 | Test Example 5 |
|---|---|---|---|---|---|
| SS [mg/L] | 32 | 28 | 28 | 22 | 26 |
| T-N [mg/L] | 57 | 46 | 41 | 54 | 47 |
| T-P [mg/L] | 3.2 | 1.8 | 2.2 | 0.9 | 0.4 |
| Fe [mg/L] | 28 | 22 | 13 | 2.1 | 1.1 |
| Mn [mg/L] | 0 | 0 | 0 | 0 | 0 |
| Cu [mg/L] | 0.4 | 0.3 | 0.4 | 0 | 0 |
| Cr [mg/L] | 0 | 0 | 0 | 0 | 0 |

TABLE 3

|  | Test Example 6 | Test Example 7 | Test Example 8 | Test Example 9 | Test Example 10 |
|---|---|---|---|---|---|
| Green rust suspension [pts by wt.] | 92 | 92 | 92 | 90 | 90 |
| Yttrium ferrite [pts by wt.] | 2 | 3 | 4 | 0 | 0 |
| Aluminum ferrite [pts by wt.] | 6 | 5 | 4 | 10 | 10 |
| Basalt fibers | Without | Without | Without | Without | With |
| Days [day] | 4 | 4 | 4 | 4 | 4 |
| TOC [mg/L] | 117 | 95.1 | 97.4 | 108 | 84.7 |
| COD [mg/L] | 82 | 85 | 85 | 94.4 | 87.2 |
| n-Hex [mg/L] | 12 | 7.4 | 8.7 | 3.6 | 1.6 |
| SS [mg/L] | 3.8 | 4.6 | 3.2 | 2.6 | 2.1 |
| T-N [mg/L] | 44 | 42 | 58 | 39 | 21 |
| T-P [mg/L] | 0.4 | 0.2 | 0.4 | 0.3 | 0.1 |
| Fe [mg/L] | 1.4 | 0.6 | 4.8 | 0.3 | 0.2 |
| Mn [mg/L] | 0 | 0 | 0 | 0 | 0 |
| Cu [mg/L] | 0 | 0 | 0 | 0 | 0 |
| Cr [mg/L] | 0 | 0 | 0 | 0 | 0 |

In Test Examples 1 to 10, 4 days or 5 days of crude oil sludge treatment were sufficient to solubilize most of the crude oil sludge in water. Crude oil sludge treatment agents containing metal ferrite were used for Test Examples 2 to 10. In Test Examples 2 to 10, the n-Hex values were lower compared to Test Example 1 which contained no metal ferrite. These results indicate that a crude oil sludge treatment agent containing metal ferrite can promote decomposition of the oil components in crude oil sludge. For example, the n-Hex values in Test Examples 2 to 5 indicate that decomposition of the oil components in crude oil sludge can be further promoted by containing any of the metal ferrites: aluminum ferrite, yttrium ferrite or zinc ferrite to a crude oil sludge treatment agent. Test Example 10 which used basalt fibers showed that n-Hex can be reduced compared to Test Example 9 which did not use basalt fibers.

The liquid to be treated containing crude oil sludge and water used in each of the test examples also contained 18 mg/L of hydrogen sulfide. Hydrogen sulfide can be measured by the method of Attachment II according to "Methods of measuring specific offensive odors," Article 5 of the Offensive Odor Control Law Enforcement Ordinance in Japan. The liquid to be treated containing crude oil sludge and water used in each of the test examples also contained 0.00029 mass % thiols (mercaptans). Thiols can be measured according to the thiol sulfur content test method of JIS K2276:2003. In each of the test examples, no hydrogen sulfide or thiols was detected at the start of the mixing step in which the crude oil sludge, water and crude oil sludge treatment agent were mixed under alkali conditions.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A crude oil sludge treatment agent to be mixed with crude oil sludge and water for treatment of the crude oil sludge under alkali conditions, wherein the crude oil sludge treatment agent comprises green rust.

2. The crude oil sludge treatment agent according to claim 1, further comprising either or both a metal and a metal ferrite, wherein the metal and the metal of the metal ferrite are one or more selected from the group consisting of aluminum, yttrium, zinc, copper, tin, chromium and silicon.

3. The crude oil sludge treatment agent according to claim 1, further comprising one or more selected from the group consisting of aluminum ferrite, yttrium ferrite and zinc ferrite.

4. A crude oil sludge treatment method comprising a mixing step in which crude oil sludge, water and green rust are mixed under alkali conditions.

5. The crude oil sludge treatment method according to claim 4, wherein the mixing step is carried out within a container housing basalt fibers.

6. A crude oil sludge treatment agent kit to be mixed with crude oil sludge and water for treatment of the crude oil sludge under alkali conditions, wherein the kit comprises:
 a first agent containing green rust, and
 a second agent containing either or both a metal and a metal ferrite, wherein the metal and the metal of the metal ferrite are one or more selected from the group consisting of aluminum, yttrium, zinc, copper, tin, chromium and silicon.

\* \* \* \* \*